US005572194A

United States Patent [19]

Shiota

[11] Patent Number: 5,572,194

[45] Date of Patent: Nov. 5, 1996

[54] BROADCAST RECEIVER AND SIGNAL REPRODUCTION APPARATUS CONTROLLED USING RDS DATA

[75] Inventor: Shinichi Shiota, Tokyo, Japan

[73] Assignee: Sony Corporation, Tokyo, Japan

[21] Appl. No.: 300,328

[22] Filed: Sep. 2, 1994

[30] Foreign Application Priority Data

Sep. 10, 1993 [JP] Japan .................................... 5-249768

[51] Int. Cl.[6] ................................ H04B 1/16; H04Q 5/14

[52] U.S. Cl. ................................ 340/825.25; 340/825.22; 340/825.69; 340/825.72; 369/4; 369/24; 455/186.1; 455/186.2

[58] Field of Search ........................ 340/825.72, 825.69, 340/825.22, 825.25; 369/4, 24; 455/186.1, 186.2

[56] References Cited

U.S. PATENT DOCUMENTS

| | | | |
|---|---|---|---|
| 4,274,082 | 6/1981 | Litz et al. | 340/825.57 |
| 4,807,052 | 2/1989 | Amano | 340/825.22 |
| 4,887,308 | 12/1989 | Dutton | 455/156 |
| 5,132,679 | 7/1992 | Kubo et al. | 340/825.22 |
| 5,182,552 | 1/1993 | Paynting | 340/825.25 |
| 5,222,254 | 6/1993 | Verron et al. | 455/186.2 |
| 5,228,077 | 7/1993 | Darbee | 379/102 |
| 5,239,681 | 8/1993 | Parnall et al. | 455/186.2 |
| 5,303,401 | 4/1994 | Duckeck et al. | 455/186.1 |
| 5,313,524 | 5/1994 | Van Hulle et al. | 340/825.25 |
| 5,345,607 | 9/1994 | Liman et al. | 455/186.1 |
| 5,355,526 | 10/1994 | Berninger | 455/186.1 |
| 5,428,825 | 6/1995 | Tomohiro et al. | 455/186.1 |
| 5,471,662 | 11/1995 | Shiota | 455/186.1 X |

FOREIGN PATENT DOCUMENTS

| | | | |
|---|---|---|---|
| 0264053A2 | 4/1988 | European Pat. Off. | H04N 1/00 |
| 0503154A2 | 9/1992 | European Pat. Off. | 455/186.1 |
| 3912945A1 | 10/1989 | Germany | H04H 1/00 |
| 1276828 | 11/1989 | Japan | 455/186.2 |
| 2191643 | 12/1987 | United Kingdom | 340/825.22 |
| 1O 87/06416 | 10/1987 | WIPO | H04N 7/087 |

OTHER PUBLICATIONS

Specifications Of The Radio Data System RDS For VHF/FM Sound Broadcasting–Tech. 3244–E Mar. 1984 Technical Center of the European Broadcasting Union–Bruxelles, Belgium.

*Primary Examiner*—Michael Horabik
*Assistant Examiner*—William H. Wilson, Jr.
*Attorney, Agent, or Firm*—Limbach & Limbach LLP

[57] ABSTRACT

A signal reproduction apparatus such as an audio apparatus consists of a plurality of devices including a receiver. The receiver receives a broadcast wave signal (such as an FM signal) which includes a primary signal, along with data (such as RDS data) relating to a broadcasting station, a program, etc. transmitted together with the primary signal. The receiver includes a tuner circuit for receiving the broadcast wave signal, a decoder circuit and a signal generation device. The decoder circuit extracts the data (such as RDS data) relating to the broadcasting station and the program from the broadcast wave signal received by the tuner circuit. The signal generation device generates a remote control signal based on the data output from the decoder circuit, and outputs the generated remote control signal. The audio device includes a receiving section for receiving the remote control signal output from the signal generation device. The operation of the audio device is controlled based on the control signal output from the signal generation device of receiving section.

11 Claims, 3 Drawing Sheets

BROADCAST RECEIVER AND SIGNAL REPRODUCTION APPARATUS CONTROLLED USING RDS DATA

BACKGROUND

1. Field of the Invention

The present invention relates to a receiver and a signal reproduction apparatus using it. More specifically, the invention relates to a receiver for receiving a transmission signal which includes data relating to a broadcast station, programs, etc. as well as a primary signal, and a signal reproduction apparatus using such a receiver.

2. Background of the Invention

Part of FM stations in Europe provide the RDS (radio data system) service, in which a primary audio signal is broadcast together with RDS data. The RDS data is a collection of digital data relating to a broadcasting station, programs, etc., and includes the following data:

PS data . . . Character data indicating a broadcasting station name

PI code . . . Program identification code

AF list . . . List of frequencies of the broadcasting stations that are transmitting the same program PTY code . . . Identification code indicating the content of a program PIN code . . . Program item number code EON data . . . Information on other networks The PI code is 16-bit data including a country code, a program code, etc., and is transmitted 11 times/sec. The AF list includes data of 25 stations at the maximum. The PTY code is a 5-bit code indicating a genre of a program such as news, pops, education, sports or information. The PIN code indicates a scheduled broadcast start time, and is used for a reserved reception.

The RDS data is subjected to encode processing for error correction, and a subcarrier signal having a frequency of 57 kHz (three times the frequency 19 kHz of the stereo pilot signal) is subjected to balanced modulation by the encode-processed RDS data. The modulated signal is added to and frequency-multiplied with a primary signal, i.e., a monaural signal or stereo composite signal, and the multiplied signal is transmitted as an FM wave.

Therefore, an FM radio capable of receiving the RDS data can be tuned to a particular broadcasting station or can receive a particular program.

In the following description, a broadcasting station practicing the RDS service is referred to as "RDS station," when necessary.

By the way, an audio apparatus called a component stereo set is constituted by combining an FM tuner, a cassette deck, a graphic equalizer (equalizer amplifier), a pre-main amplifier, etc. However, in terms of functions, a user merely selectively uses the respective devices constituting the audio apparatus.

As a result, in conventional audio apparatuses, even if a decoder circuit for the RDS data is provided in an FM tuner, a user cannot utilize the RDS service effectively. For example, although a broadcasting station name etc. are displayed by use of the RDS data while an RDS station is being received, a listener will not hear the start of a news program if a tape cassette is being reproduced. As another example, when an emergency broadcast is performed, a listener may not hear it.

SUMMARY OF THE INVENTION

It is, therefore, an object of the present invention to provide a receiver which solves the above-mentioned problem.

It is another object of the invention to provide a signal reproduction apparatus which solves the above-mentioned problem.

According to the present invention, there is provided a receiver including a tuner circuit, a decoder circuit and a signal generation device. The receiver receives a transmission signal which includes a primary signal along with data relating to a broadcasting station and a program transmitted together with the primary signal. The tuner circuit receives and demodulates the transmission signal. The decoder circuit extracts the data relating to the broadcasting station and the program from the transmission signal received by the tuner circuit. The signal generation device generates a remote control signal based on the data output from the decoder circuit, and outputs the generated remote control signal.

Further, according to the invention, there is provided a signal reproduction apparatus including a receiver and an audio device. The receiver receives a transmission signal which includes a primary signal along with data relating to a broadcasting station and a program transmitted together with the primary signal. The receiver includes a tuner circuit for receiving and demodulating the transmission signal, a decoder circuit and a signal generation device. The decoder circuit extracts the data relating to the broadcasting station and the program from the transmission signal received by the tuner circuit. The signal generation device generates a remote control signal based on the data output from the decoder circuit, and outputs the generated remote control signal. The audio device includes a receiving section for receiving the remote control signal output from the signal processing device, and for outputting a control signal to be used for controlling an operation of the audio device.

According to the invention, where the data relating to a broadcasting station and a program and transmitted together with a primary signal represents a preset condition, the receiver outputs a remote control signal to render the other devices into states suitable for the preset condition. Therefore, a user never fails to hear a necessary or desired broadcast, such as traffic information or an emergency broadcast.

BRIEF DESCRIPTION OF THE DRAWINGS

The present invention will be more readily understood with reference to the accompanying drawings, wherein:

FIGS. 1A and 1B are block diagrams showing a configuration of an audio apparatus according to a first embodiment of the invention, in which FIG. 1A is a block diagram showing part of the configuration of the audio apparatus according to the first embodiment, and FIG. 1B is a block diagram showing the remaining part of the configuration of the audio apparatus according to the first embodiment.

DESCRIPTION OF THE INVENTION

In the following, a receiver and a signal reproduction apparatus using signals received by the receiver according to the present invention will be described in detail with reference to the accompanying drawings. In preferred embodiments described below, the signal reproduction apparatus is exemplified by an audio apparatus constituted of a receiver and a plurality of audio devices.

Figure 1A:
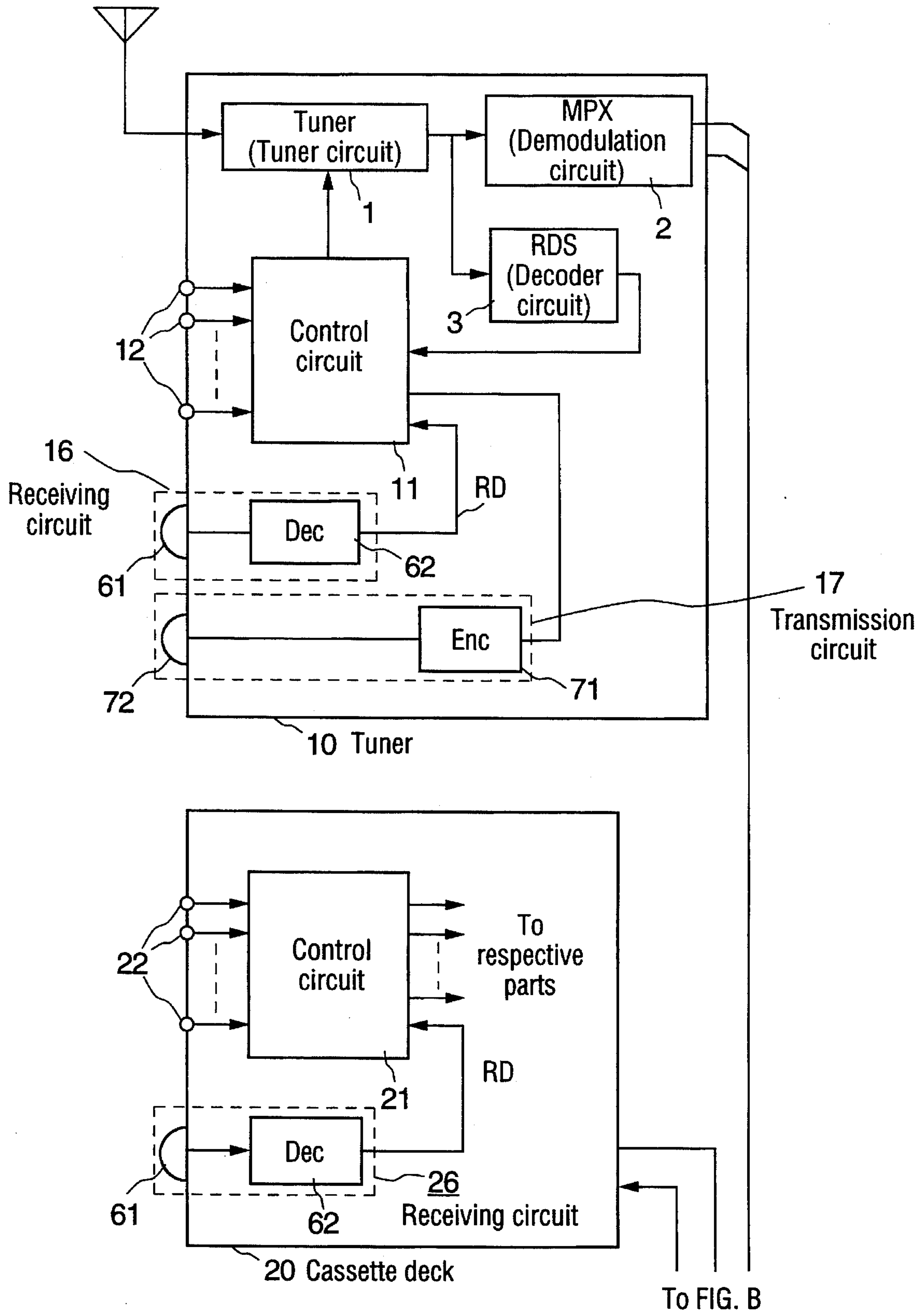
Figure 1B:
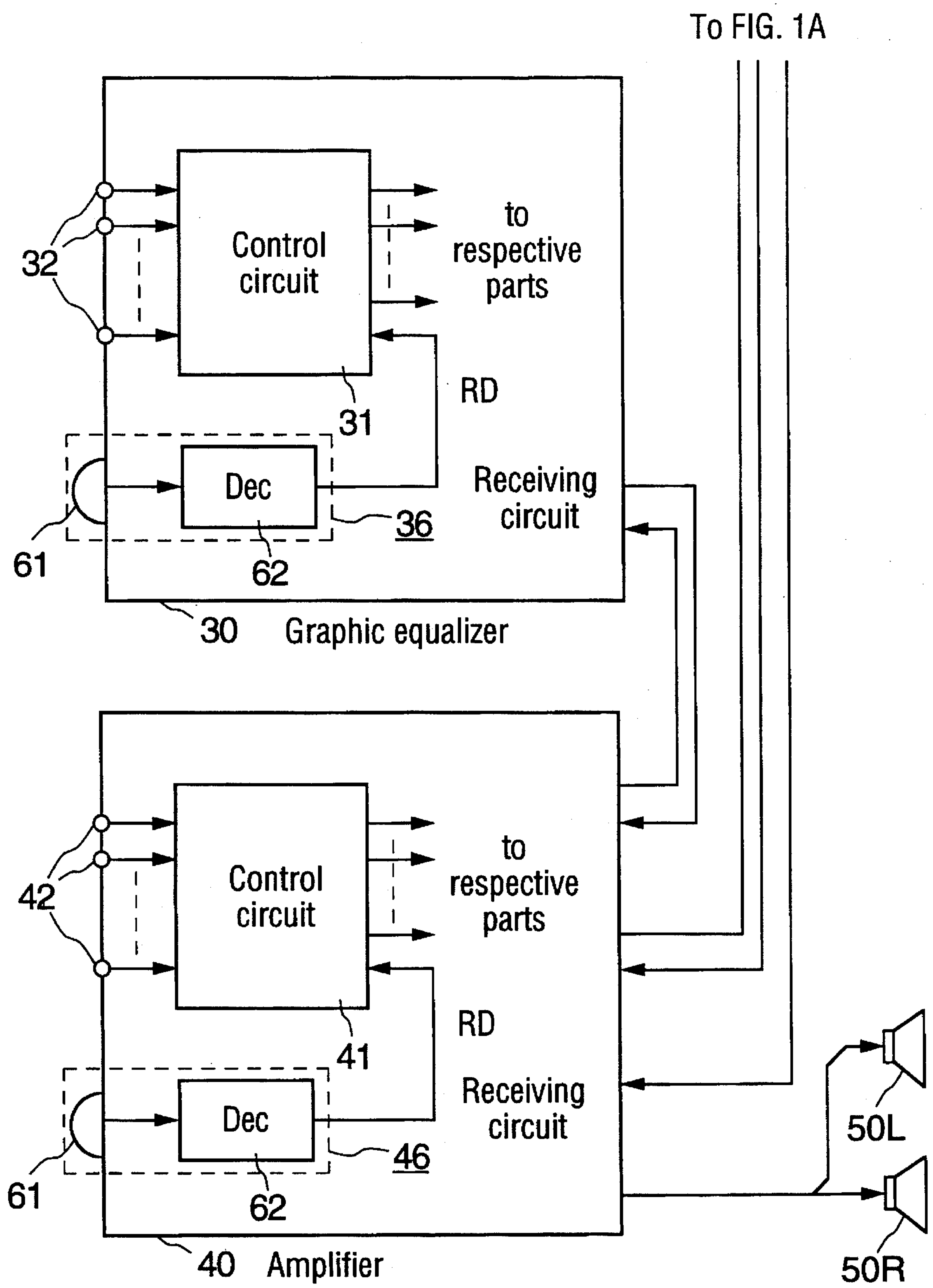

In FIGS. 1A and 1B, reference numeral 10 denotes an FM tuner. Reference numeral 20 denotes a cassette deck. Reference numeral 30 denotes a graphic equalizer. Reference numeral 40 denotes a premain amplifier. Reference numerals 50R and 50L denote right-channel and left-channel speakers respectively. The bottom portion of FIG. 1A is connected at the top portion of FIG. 1B as shown.

In the FM tuner 10, reference numeral 1 denotes a tuner circuit having a high-frequency wave input circuit and an FM demodulation circuit to receive a broadcast wave signal. Numerals 2 and 3 represent a stereo demodulation circuit and a decoder circuit for the RDS data, respectively.

A stereo composite signal including a primary signal and a modulation signal that has been modulated by the RDS data are output from the tuner circuit 1. The stereo composite signal is supplied to the demodulation circuit 2, which demodulates right-channel and left-channel stereo audio signals. At the same time, the modulation signal that has been modulated by the RDS data is supplied to the decoder circuit 3, which decodes the RDS data.

Reference numeral 11 denotes a control circuit for system control that is constituted of a microcomputer, and numeral 12 represents various operation keys. The RDS data that is output from the decoder circuit 3 is sent to the control circuit 11. Also, outputs of the keys 12 are sent to the control circuit 11. Receiving various control signals from the control circuit 11, the tuner circuit 1 performs tuning, etc.

Further, a receiving circuit 16 that operates in remote-control the tuner 10 is provided in the tuner 10. In this first embodiment, the remote control is performed by using infrared light. The receiving circuit 16 consists of a photodetector 61 for receiving infrared light sent from a remote commander (not shown) and a decoder 62 for extracting remote control data RD from an output signal of the photodetector 61. The remote control data RD as output from the decoder 62 is supplied to the control circuit 11.

In this case, the remote control data RD includes, for instance, category data for designating a device to be remote-controlled, and command data for designating an operation mode of the device to be controlled. If necessary, the remote control data RD further includes parameters relating to the command data.

Therefore, infrared light, which is emitted from the remote commander (not shown) as a transmitter, is detected by the photodetector 61, and an output signal of the photodetector 61 is input to the decoder 62, where the remote control data RD is extracted. The remote control data RD is supplied from the decoder 62 to the control circuit 11 (hereinafter control circuit 11 is sometimes referred to as microcomputer 11). If category data of the remote control data RD designates the tuner 10, the remote control data RD is regarded as effective. The microcomputer 11 causes the tuner 10 to perform an operation, for instance, tuning, that accords with the command data (and its parameters) included in the remote control data RD.

The tuner 10 is further provided with a transmission circuit 17 for remote-controlling devices 20, 30 and 40. In this case, since, as described later, receiving circuits of the devices 20, 30 and 40 are constituted in the same manner as the receiving circuit 16 of the tuner 10, the transmission circuit 17 is of the type that uses infrared light as a communication medium. More specifically, prescribed remote control data RD is supplied from the control circuit 11 to an encoder 71. The remote control data RD is converted by the encoder 71 to a remote control signal, such as a PWM signal, which is supplied to an infrared LED 72 that is a light source for emitting infrared light. Therefore, when the remote control data RD is output from the control circuit 11, the LED 72 emits infrared light that corresponds to the remote control data RD.

Since audio signal processing systems in the devices 20, 30 and 40 are constituted in the same manner as in the ordinary audio devices, descriptions therefor are omitted here.

Further, in the devices 20, 30 and 40, reference numerals 21, 31, and 41 respectively denote control circuits for system control each constituted of a microcomputer. Reference numerals 22, 32 and 42 respectively denote various operation keys for the devices 20, 30, 40. The devices 20, 30 and 40 respectively have the receiving circuits 26, 36 and 46 that are similar to the receiving circuit 16. Remote control data RD as output signals of the receiving circuits 26, 36 and 46 are respectively supplied to the control circuits 21, 31 and 41.

The devices 20, 30 and 40 are so constituted that switching and adjustment of their characteristics can be controlled by operating the keys 22, 32 and 42 or using remote commanders (not shown) as transmitters. Since this constitution is the same as in conventional audio devices, descriptions therefor are also omitted here. It is assumed that the control circuits 21, 31 and 41 and the receiving circuits 26, 36 and 46 are always in operational states irrespective of whether the power of the devices 20, 30 and 40 is on or off.

The audio signals are sent from the tuner 10 to the amplifier 40, and part of the input audio signals selected by the amplifier 40 are supplied to the cassette deck 20 as a recording input therefor. A reproduction output (or recording monitor output) of the cassette deck 20 is supplied to the amplifier 40. Audio signals are supplied from the amplifier 40 to the equalizer 30. After being subjected to prescribed signal processing such as correction of the frequency characteristic in the equalizer 30, the processed audio signals are again supplied to the amplifier 40. Further, audio signals are supplied from the amplifier 40 to the speakers 50R and 50L. The speakers 50R and 50L convert the received audio signals to output reproduction sounds.

With the above constitution, when the RDS service is not utilized, the reception of FM broadcasts and the recording onto and reproduction from a tape cassette, the sound field correction by the graphic equalizer 30, and other operations can be performed in the same manner as in conventional audio devices by operating the operation keys 12, 22, 32 and 42 of the respective devices 10, 20, 30 and 40.

Further, the operations of the respective devices 10, 20, 30 and 40 can be remote-controlled by using remote commanders.

When the RDS service is utilized, the following operations, for instance, are additionally performed.

Reserved reception of traffic information

This operation is to enable listening of traffic information when it is broadcast. During broadcast of traffic information, the TA code of the EON service becomes "1."

In this case, the reserved reception of traffic information (based on the TA code) is designated by operating the keys 12 or the remote commander (not shown) of the tuner 10, and the reserved reception of traffic information thus set is input to the control circuit 11.

Transmitted RDS data is decoded by the decoder circuit 3, and decoded data is supplied to the control circuit 11.

When judging that the TA code has turned to "1," the control circuit 11 generates prescribed remote control data RD and supplies it to the transmission circuit 17. The remote control data RD as modulated by the transmission circuit 17 is supplied to the LED 72, which emits infrared light.

The receiving circuits 16, 26, 36 and 46 of the respective devices 10, 20, 30 and 40 receive the infrared light, so that the remote control data RD are respectively supplied to the control circuits 11, 21, 31 and 41. In the example under consideration, the power of the devices 20, 30 and 40 is turned on in response to the remote control data RD if it is off.

Then, prescribed remote control data RD is generated by the control circuit 11, input to the LED 72 through the transmission circuit 17, and emitted from the LED 72 toward the amplifier 70. As a result, a function switch of the amplifier 40 is switched to the tuner input position based on the transmitted remote control data RD.

Next, prescribed remote control data RD is generated by the control circuit 11, input to the LED 72 through the transmission circuit 17, and emitted from the LED 72 toward the graphic equalizer 30. As a result, the frequency characteristic and the reverberation characteristic of the graphic equalizer 30 are so set as to make reproduction sounds, particularly voices, that are output from the speakers 50R and 50L become highly audible.

Then, prescribed remote control data RD is generated by the control circuit 11, input to the LED 72 through the transmission circuit 17, and emitted from the LED 72 toward the cassette deck 20. As a result, the cassette deck 20 is set to a recording mode based on the received remote control data RD. In this case, the remote control data RD is simultaneously emitted from the LED 72 toward the respective devices 10, 20, 30 and 40. However, since, as described above, each of the devices 10, 20, 30 and 40 recognizes the category data of the remote control data RD, only the device designated by the category data operates in response to particular RD data associated with the category data.

When recognizing that the TA code in the RDS data has turned to "1," the control circuit 10 turns on the power of the amplifier 40, equalizer 30 and cassette deck 20 and renders those devices into an operating state by supplying the remote control data RD to those devices. As described above, after the amplifier 40, equalizer 30 and cassette deck 20 are switched to the predetermined operation states, an output signal of the stereo demodulation circuit 2 of the tuner 10 is supplied to the amplifier 40, and also supplied to the equalizer 30 and the cassette deck 20 through the amplifier 40. The part of the output signal of the amplifier 40 that has been processed by the equalizer 30 is again supplied to the amplifier 40, and then to the speakers 50R and 50L. Thus, a user etc. can hear traffic information as reproduction sounds. At the same time, the output signal of the amplifier 40 is supplied to the cassette deck 20 and recorded onto a tape cassette accommodated therein.

The reserved reception of traffic information can be effected in the above manner. The TA code turns to "0" upon completion of traffic information. It is possible to turn off the power of the devices 20, 30 and 40 when the control circuit 11 detects this change of the TA code by supplying remote control data RD to the LED 72 through the transmission circuit 17 and causing the LED 72 to transmit it to the respective devices 20, 30 and 40.

Preferential reception of emergency broadcast

This operation is to enable listening to an emergency broadcast with a priority given to it over tape cassette reproduction, etc. During an emergency broadcast, the PTY code has a prescribed value.

In this case, the enablement of emergency broadcast listening (based on the PTY code) is selected by operating the keys 12 or the remote commander (not shown) of the tuner 10. A prescribed value is set to correspond to the PTY code value for emergency broadcasts, and the prescribed value thus set is input to the control circuit 11.

Transmitted RDS data is decoded by the decoder circuit 3, and decoded data is input to the control circuit 11. When recognizing that the PTY code has turned to the prescribed value indicating an emergency broadcast, the control circuit 11 generates prescribed remote control data RD. The prescribed remote control data RD is supplied to the transmission circuit 17, and the LED 72 emits infrared light. The receiving circuits 16, 26, 36 and 46 of the respective devices 10, 20, 30 and 40 receive the infrared light, and decoded remote control data RD are supplied to the respective control circuits 11, 21, 31 and 41. In this example under consideration, the power of the devices 20, 30 and 40 is turned on in response to the remote control data RD if it is off.

Then, prescribed remote control data RD is generated by the control circuit 11, supplied to the transmission circuit 17, and then transmitted from the LED 72 toward the amplifier 40. As a result, the function switch of the amplifier 40 is switched to the tuner input position based on the received remote control data RD.

Next, prescribed remote control data RD is generated by the control circuit 11, supplied to the transmission circuit 17, and then transmitted from the LED 72 toward the graphic equalizer 30. Based on the received remote control data RD, the frequency characteristic and the reverberation characteristic of the equalizer 30 are set so as to make highly audible the reproduced sounds of the speakers 50R and 50L.

Then, prescribed remote control data RD is generated by the control circuit 11, supplied to the transmission circuit 17, and then transmitted from the LED 72. Based on the received remote control data RD, the sound volume of the amplifier 40 is increased.

Further, prescribed remote control data RD is generated by the control circuit 11, supplied to the transmission circuit 17, and transmitted from the LED 72. Based on the received remote control data RD, the cassette deck 20 is set to the recording mode.

When recognizing that the PTY code has turned to the prescribed value, the control circuit 11 renders the amplifier 40, equalizer 30 and cassette deck 20 to the above-described preset operation states, i.e., the states for the preferential reproduction of an emergency broadcast by supplying remote control data RD to those devices 20, 30 and 40. After the above-described switching operations are finished, an output signal produced by demodulating an emergency broadcast is supplied from the stereo demodulation circuit 2 of the tuner 10 to the amplifier 40, and also supplied to the equalizer 30 and the cassette deck 20 through the amplifier 40. The part of the output signal of the amplifier 40 that has been input to the equalizer 30 is processed by the equalizer 30 and then supplied to the amplifier 40. The output signal that has been input from the equalizer 30 to the amplifier 40 is supplied to the speakers 50R and 50L to allow a user to hear the emergency broadcast. The sounds output from the speakers 50R and 50L at this time is set at a larger volume than those of ordinary reproduction such as those when traffic information is reproduced (described above). At the same time, the content of the emergency broadcast is recorded onto a tape cassette.

When the emergency broadcast is finished, the PTY code changes to another value. When recognizing the change of the PTY code, the control circuit 11 supplies remote control data RD to the transmission circuit 17 and the LED 72 transmits the remote control data RD to the devices 20, 30 and 40. Based on the received remote control data RD, the function switch of the amplifier 40 is switched to the tape reproduction input position.

As in the above operation, to set the operation states of the respective devices 20, 30 and 40, the remote control data RD is simultaneously sent from the LED 72 toward the respective devices. Each of the devices 20, 30 and 40 recognizes the category data included in the remote control data RD, and only the device designated by the category data operates to set itself to the intended operation state according to the associated remote control data RD.

Then, prescribed remote control data RD is generated by the control circuit 11, supplied to the transmission circuit 17, and emitted from the LED 72. The operation mode of the cassette deck 20 is switched to repeat reproduction based on the received remote control data RD. The emergency broadcast recorded on the tape cassette is repeatedly reproduced until a user changes the operation mode to a stop mode.

In the above manner, when an emergency broadcast occurs, it is output from the speakers 50R and 50L. Even after completion of the emergency broadcast, it can be repeatedly output by means of the cassette deck 20.

Absent recording

This operation serves to automatically record a broadcast, and is performed by using the PIN code.

In this case, a prescribed value is set to correspond to the PIN code value of the desired program by operating the keys 12 or the remote commander (not shown) of the tuner 10. The prescribed value thus set is input to the control circuit 11.

Transmitted RDS data is decoded by the decoder circuit 3, and the decoded data is input to the control circuit 11. When detecting that the PIN code has turned to be the prescribed value, the control circuit 11 generates prescribed remote control data RD, which is modulated by the transmission circuit 17 and transmitted from the LED 72. The receiving circuits 16, 26, 36 and 46 of the devices 10, 20, 30 and 40 receive the infrared light, and decoded remote control data RD are supplied to the control circuits 11, 21, 31 and 41. In this example under consideration, the power of the devices 20, 30 and 40 is turned on in response to the remote control data RD if it is off.

Then, prescribed remote control data RD is generated by the control circuit 11, supplied to the transmission circuit 17, and transmitted from the LED 72. The function switch of the amplifier 40 is switched to the tuner input position based on the received remote control data RD.

Next, prescribed remote control data RD is generated by the control circuit 11, supplied to the transmission circuit 17, and transmitted from the LED 72. Based on the received remote control data RD, the frequency characteristic and the reverberation characteristic of the graphic equalizer 30 are set so as to be suitable for the genre of a program indicated by the PTY code.

Then, prescribed remote control data RD is generated by the control circuit 11, supplied to the transmission circuit 17, and transmitted from the LED 72. The cassette deck 20 is set to the recording mode based on the received remote control data RD.

In the above operation, the remote control data RD is simultaneously sent from the LED 72 toward the respective devices. As described above, each of the devices 20, 30 and 40 recognizes the category data included in the remote control data RD, and only the device designated by the category data operates based on the particular RD data associated with category data.

Therefore, when detecting that the PIN code included in the RDS data is the same as the prescribed value, the control circuit 11 supplies the remote control data RD to the amplifier 40, equalizer 30 and cassette deck 20 to render those devices into the predetermined operation states, i.e., operation states for performing the absent recording. After the operation state switching is completed, a demodulated output signal relating to a program designated by the PIN code is supplied from the stereo demodulation circuit 2 of the tuner 10 to the amplifier 40, and also to the cassette deck 20 through the amplifier 40. In this case, it is not always necessary that the output signal as corrected by the equalizer 30 be supplied to the cassette deck 20 through the amplifier 40. In the cassette deck 20, the signal thus supplied is automatically recorded onto a tape cassette accommodated therein.

When the completion of the program is detected by the control circuit 11 based on the transmitted RDS data, remote control data is generated by the control circuit 11, supplied to the transmission circuit 17, and transmitted from the LED 72. Based on the received remote control data RD, the power of the respective devices 20, 30 and 40 is turned off, and the absent recording operation is finished.

As described above, when it is detected that the RDS data of the above-mentioned RDS service satisfies some predesignated condition, the tuner 10 supplies the remote control data to the respective devices 20, 30 and 40 to render those devices into the preset operation states. For example, in the devices 20, 30, 40 can be rendered into preset operation states based on the RDS data so that the user will always hear an emergency broadcast.

The above operations can be realized merely by adding the transmission circuit 17, some programs to the tuner 17, and, therefore, only a small cost increase is incurred.

Next, a receiver and a signal reproduction apparatus according to a second embodiment of the invention will be described. The parts common to those of the first embodiment are given the same reference numerals, and detailed descriptions therefor will be omitted. As in the case of the first embodiment, the second embodiment is directed to an audio apparatus as the signal reproduction apparatus.

Figure 2:
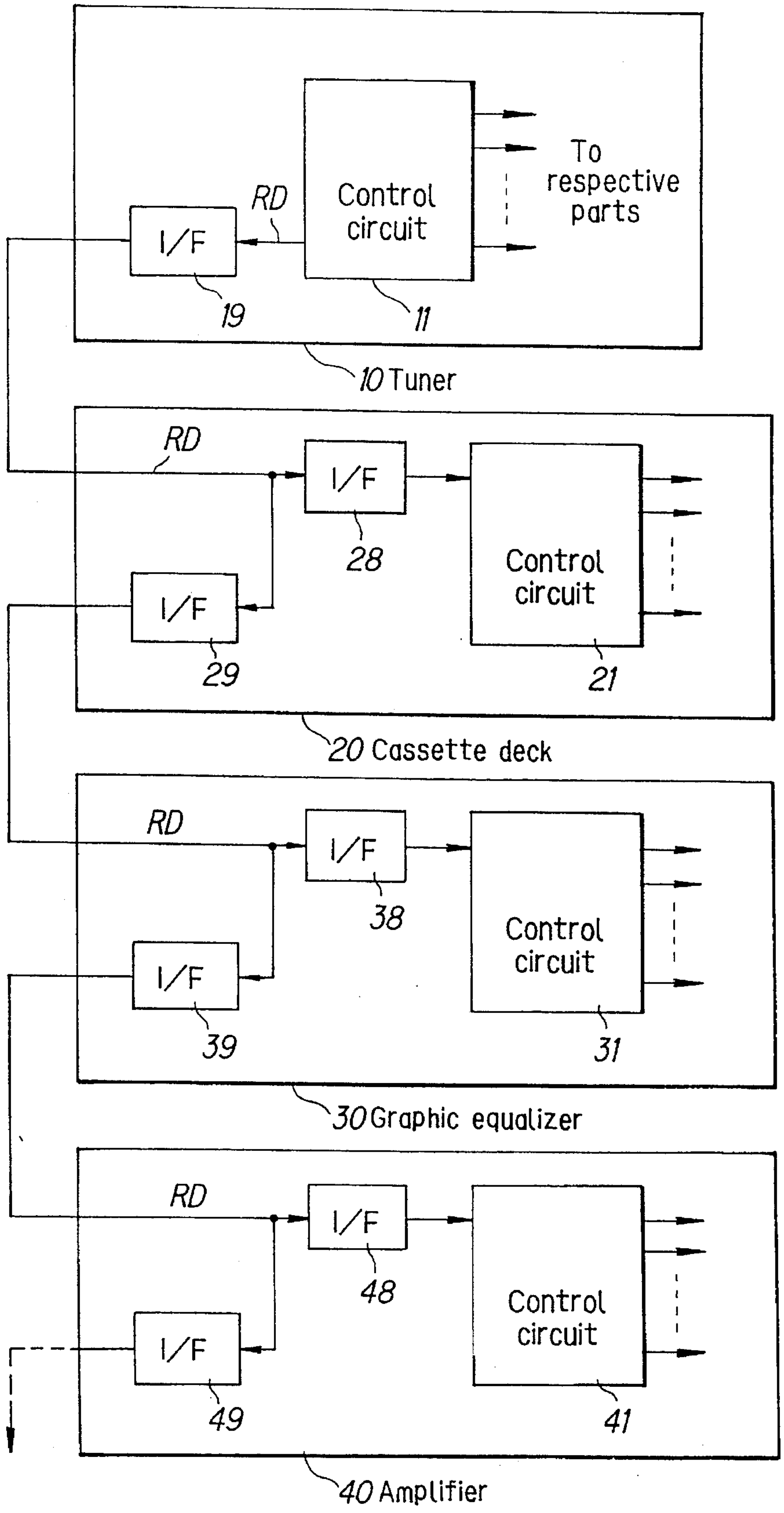
FIG. 2 is a block diagram showing a configuration of an audio apparatus according to a second embodiment of the invention.

Referring to FIG. 2, an output interface (transmission buffer circuit) 19 is provided in the tuner 10, and input interfaces (receiving buffer circuits) 28, 38 and 48 and output interfaces (transmission buffer circuits) 29, 39 and 40 are provided in the respective devices 20, 30 and 40. Remote control data RD is supplied from the control circuit 11 to the control circuits 21, 31 and 41 through the buffers 19, 29, 39 and 49 by the daisy-chain scheme as shown in FIG. 2.

Therefore, in this embodiment, when RDS data of the RDS service satisfying a predesignated condition is received, the tuner 10 supplies remote control data RD to the other devices 20, 30 and 40 through the output interfaces and the input interfaces to render the those devices 20, 30 and 40 in their states suitable for the predesignated condition.

What is claimed is:

1. A signal reproduction apparatus comprising:

an audio device;

a receiver for receiving a transmission signal which includes a primary signal, and data relating to a broadcasting station and a program transmitted together with the primary signal, said receiver comprising:

a tuner circuit for receiving and demodulating the transmission signal;

a decoder circuit for extracting the data relating to the broadcasting station and the program from the transmission signal received by the tuner circuit;

a signal generation device for generating a remote control signal based on the data output from the decoder circuit, and outputting the generated remote control signal; and an input section to be used for setting an operation state of the audio device; and a control circuit for comparing a preset condition set through the input section with the data output from the decoder circuit and for supplying a control signal to the signal generation device when the data output from the decoder circuit coincides with the preset condition; and the audio device including a receiving section for receiving the remote control signal output from the signal generation device, and for controlling an operation of the audio device based on the remote control signal;

wherein the signal generation device generates a remote control signal based on the supplied control signal, and supplies the generated remote control signal to the audio device; and wherein when receiving, from the decoder circuit, data representing a prescribed broadcast with the audio device in a power-off state, the control circuit causes the signal generation device to output a remote control signal for turning on a power of the audio device.

2. A signal reproduction apparatus comprising:

an audio device;

a receiver for receiving a transmission signal which includes a primary signal, and data relating to a broadcasting station and a program transmitted together with the primary signal, said receiver comprising:

a tuner circuit for receiving and demodulating the transmission signal;

a decoder circuit for extracting the data relating to the broadcasting station and the program from the transmission signal received by the tuner circuit;

a signal generation device for generating a remote control signal based on the data output from the decoder circuit, and outputting the generated remote control signal; and an input section to be used for setting an operation state of the audio device; and a control circuit for comparing a preset condition set through the input section with the data output from the decoder circuit and for supplying a control signal to the signal generation device when the data output from the decoder circuit coincides with the preset condition; and the audio device including a receiving section for receiving the remote control signal output from the signal generation device, and for controlling an operation of the audio device based on the remote control signal;

wherein the signal generation device generates a remote control signal based on the supplied control signal, and supplies the generated remote control signal to the audio device; and wherein when receiving, from the decoder circuit, data representing a prescribed broadcast with the audio device in a first reproduction state for reproducing something other than the prescribed broadcast, the control circuit causes the signal generation device to output a remote control signal for controlling the audio device stop the first reproduction state and to start a second reproduction state for reproducing the prescribed broadcast.

3. An audio signal reproduction system for reproducing broadcast signals as sound, the system comprising:

a tuner circuit for receiving broadcast composite signals, the composite signals including a primary signal and a secondary digital signal;

a demodulation circuit for demodulating the primary signal to produce an audio signal;

a decoder circuit for decoding the secondary digital data;

a control circuit for receiving the decoded secondary digital data and for generating a control signal based on the decoded secondary digital data; and an audio signal processor for receiving the audio signal and the control signal, and for processing the audio signal in accordance with the control signal.

4. The audio reproduction system of claim 3, wherein the audio signal processor comprises an amplifier which selectably receives and amplifies the primary signal based on the control signal.

5. The audio reproduction system of claim 3, wherein the audio signal processor comprises an equalizer which selectably receives and equalizes the primary signal based on the control signal.

6. The audio reproduction system of claim 3, wherein the audio signal processor comprises a recording device which selectably receives and records the primary signal based on the control signal.

7. The audio reproduction system of claim 3, wherein the control circuit comprises means for comparing the decoded secondary digital data to a prescribed value, and for generating a predetermined signal as the control signal when the decoded secondary digital data is the same as the prescribed value.

8. The audio reproduction of claim 3, further comprising input means for setting the prescribed value by a user.

9. The audio reproduction system of claim 8, wherein the prescribed value corresponds to secondary digital data which is broadcast during an emergency broadcast.

10. The audio reproduction system of claim 8, wherein the prescribed value corresponds to secondary digital data which is broadcast during a traffic report.

11. The audio reproduction system of claim 8, wherein the prescribed value corresponds to secondary digital data which is broadcast during a program selected by a user.

* * * * *